United States Patent [19]
Walker et al.

[11] Patent Number: 5,217,235
[45] Date of Patent: Jun. 8, 1993

[54] SEAL ASSEMBLY

[75] Inventors: Robert A. Walker, Galston, Scotland; Anthony W. Porter, Kimberley, United Kingdom

[73] Assignees: James Howden & Co. Ltd., Scotland; Greene, Tweed & Co., Ltd., United Kingdom

[21] Appl. No.: 872,161

[22] Filed: Apr. 22, 1992

[30] Foreign Application Priority Data

Apr. 25, 1991 [EP] European Pat. Off. ............ 91303772

[51] Int. Cl.$^5$ .............................................. F16J 15/32
[52] U.S. Cl. .......................................... 277/74; 277/2; 277/27; 277/53; 277/92; 277/59; 277/81 R
[58] Field of Search ................... 277/2, 27, 53, 56, 74, 277/81 R, 92, 135, 58, 59, 65

[56] References Cited

U.S. PATENT DOCUMENTS

| | | | |
|---|---|---|---|
| 2,033,403 | 3/1936 | Smittle | 277/65 |
| 2,679,412 | 5/1954 | Whitfield | 277/74 |
| 3,044,785 | 7/1962 | Geyer . | |
| 3,914,752 | 10/1975 | Howard et al. | 277/2 |
| 4,423,878 | 1/1984 | Escue . | |
| 4,809,992 | 3/1989 | Kemp, Jr. et al. | 277/81 |
| 4,813,689 | 3/1989 | Stalter et al. | 277/65 |
| 4,819,999 | 4/1989 | Livesay et al. | 277/92 |
| 4,900,039 | 2/1990 | Klecker et al. | 277/65 |

FOREIGN PATENT DOCUMENTS

| | | |
|---|---|---|
| 0348769 | 1/1990 | European Pat. Off. . |
| 1041312 | 10/1958 | Fed. Rep. of Germany . |
| 1227632 | 4/1971 | Fed. Rep. of Germany ........ 277/74 |
| 2719949 | 11/1977 | Fed. Rep. of Germany . |
| 622325 | 3/1981 | Switzerland . |
| 763718 | 12/1956 | United Kingdom .................. 277/2 |
| 1325315 | 8/1973 | United Kingdom . |
| 1533689 | 11/1978 | United Kingdom . |
| 2094907A | 9/1982 | United Kingdom . |

Primary Examiner—Thomas B. Will
Assistant Examiner—Daniel G. DePumpo
Attorney, Agent, or Firm—Harness, Dickey & Pierce

[57] ABSTRACT

A sealing assembly between first and second relatively rotatable parts, such as the parts of a tunnel boring machine, in which a flange on a first part has a radial sealing face engaged by the axial faces of inner and outer sealing rings mounted on the body portion of the second part at radially spaced locations, a bleed passage in the second body portion opening between the sealing rings and indicating any failure in the outer sealing ring.

21 Claims, 3 Drawing Sheets

SEAL ASSEMBLY

The present invention relates to a seal assembly for sealing between first and second relatively rotatable parts.

There are many instances in which it is necessary to seal between relatively rotating parts in a very aggressive environment. One such environment is in a tunnel boring machine where there is, of course, a great deal of aggressive spoil which can contaminate the bearings of the machine and produce failure, especially in the bearings associated with the cutter head and with the spoil conveyor.

One known form of sealing system consists of several, usually at least four, fiber reinforced elastomeric lip seals which are separated by steel spacer rings and with the lips reinforced by rubber O-rings. An additional rearmost seal, i.e. next to the tunnel boring machine drive casing, is of a different section and the lip is not fiber reinforced. Such a system is designed for continuous operation at spoil pressures up to 8, 10 or even 12 bar.

The seal is continuously charged with grease at a constant volume flow such that this will lift the lip of the seal and should provide a flushing function which should prevent the seals from coming into direct contact with the spoil.

In practice, however, it has been found that failure of the sealing system can result from a combination of over-pressurization and failure of the pressure control system, such that individual seals are subjected to the full pressure of the spoil. When this happens there is a grave danger of this seal becoming destroyed by contact with the spoil.

Various other seals have been proposed and considered but none of them provides a fully satisfactory arrangement for use, for example, in a screw conveyor sealing arrangement associated with the tunnel boring machine operated under high levels of pressure.

It is now proposed, according to the present invention, to provide a seal assembly for sealing between first and second relatively rotatable parts, said assembly comprising a first body portion on the first part defining a radial sealing face, a second body portion on the second part, inner and outer sealing rings mounted on the second body portion of the second part at radially spaced locations, axial faces on said sealing rings being in sealing engagement with said radial sealing face of the first part and at least one bleed passage in said second body portion opening, at one end thereof between said inner and outer sealing rings and, at the other end thereof, on the exterior of said second body portion.

With such a structure should the outer sealing ring become attacked, due to abrasion, for example from solid particles e.g. spoil, then there will be an indication appearing at the outer end of the bleed passage(s) that some of the spoil is escaping. During this stage of operation, however, the inner seal ring will be capable of carrying out a sealing function for a considerable time.

Since the outer and inner seals are essentially the same (although the outer seal has a larger circumference), one can determine the likelihood of the time interval that the inner seal will deteriorate from the time it took the outer seal to deteriorate. Usually, therefore, one can at a suitable servicing operation after the indication in the bleed passage(s) that failure of the outer seal has taken place, stop the machinery in a planned shutdown to carry out a replacement operation on both the outer and inner seals.

Although it is expected that the life of the inner seal is the 'last line of defense' between contaminant and bearing and since there is no direct way of monitoring the effectiveness of this seal, it is advantageous to relieve the pressure acting on it as much as possible. This requirement can largely be met by the provision of at least one bleed passage or 'Tell-Tale' hole (perhaps equal in number to the grease inlet holes) which double as pressure relieving holes in the event of partial failure of the outer seal. The outlets from these holes may be connected together into a common pipe and directed to a convenient place. By this means the pressure acting on the inner seal is minimized at the cost of accepting a limited amount of external (but directed) leakage. It would also provide a means of monitoring the rate of deterioration of the outer seal.

In the event of complete failure of the outer seal and where this relief is inadequate or leakage rate is not tolerable it would be possible to either block off these holes or to utilize them for the provision of additional grease flow. The latter could be particularly advantageous if the inner seal is also suspect since it would provide improved flushing.

In a simple construction the second body portion comprises two concentric, radially spaced, annular grooves opening into an axial face of second body portion, said annular grooves accommodating said first and second sealing rings.

For the seals to be effective it is necessary to ensure that the contact pressure between seals and sealing face is at all times greater than the pressure of the contaminant against which they are sealing. This can preferably be achieved by applying a constant axial spring force on the seals which will exert a constant contact pressure in excess of the maximum contaminant pressure envisaged. The axial spring force may be provided by a spring but is preferably provided by a solid, axially-preloaded elastomeric resilient member, for reasons given below. However in applications (typical of tunnelling machines) where the maximum contaminant pressure may only occur during a very small percentage of the operating time this would mean that during most of the operating time (which could be in excess of 90% of the total) the seal contact force could be greatly in excess of that required for effective sealing. This would have a detrimental effect on seal life since it would result in needlessly accelerated wear. This would, in turn, result in a reduction in spring force which would ultimately be inadequate to seal against the maximum contaminant pressure. Another important point is that the inner seal would also be subjected to this seal contact force and as a result may already be in a worn condition if and when it is brought into service due to the failure of the outer seal.

An improvement proposed to overcome these shortcomings is to provide an adequate gap radially outward of the seals which will ensure free access of the purging grease behind the seal. It is further proposed that this grease pressure will impinge upon a solid elastomer which is located axially behind the seal and which extends unbroken for the circumference of the seal. The result of this is to ensure that the seal contact pressure is at all times a known function of the grease pressure. The grease may be fed from a simple constant volume system (i.e. with no active pressure control) and so the grease pressure would vary with that of the contaminant and would be greater only by the small margin required to overcome the system resistance of a gap or gaps between the second and first body portions.

The nature of the gap between seal and groove (to give grease access) may be either a continuous annular gap or a plurality of discrete axial grooves. The latter solution would allow the two seal rings to be adequately held together by means of the relatively tight radial clearance between seal and groove whereas in the former case some form of additional restraint would be required. This could be supplied either by a number of separate locating pegs (manufactured from a suitable material) or by the provision of an additional elastomer with suitable gaps to allow grease access.

In a particularly advantageous structure according to the invention, the outer and inner seals each comprise two concentric split sealing rings mounted in nested, radially abutting relation.

It should be found that most satisfactory results arrive if the split sealing rings are each formed of filled PTFE and if the splits in the sealing rings of a pair are circumferentially off-set, preferably by 180°.

If all seal parts are split they can be fitted to machines in situ without the need for major dismantling as would be the normal requirement in the case of endless seals. The arrangement of the parts may also be such that there is no requirement to permanently bond together the free ends of the seals before final assembly in their grooves. This latter consideration is particularly advantageous since it allows the use of materials, for the manufacture of the seals, which may be inherently difficult to permanently bond reliably in situ (such as P.T.F.E.)

In relatively large diameter applications, particularly where the seal material has a high coefficient of expansion, it is necessary to provide an appreciable gap between the free ends of the seals to allow for expansion. Due to the nature of the arrangement this would provide a potential leak path between the gaps of the outer and inner rings of each seal assembly. To obviate this risk and make the size of this gap non critical, it is proposed that a solid elastomeric energizer should always be provided behind the seals in preference to any kind of mechanical spring. It is further proposed that the elastomer would be axially pre-loaded on assembly such that it not only acts as an energizer, as previously described, but would also provide a static seal which would completely close off the formentioned leak path.

As already indicated, in a particular embodiment of the invention, the seal unit consists of two complete hoops each of which have a single split, preferably off-set at 180°. While this is always the simplest and preferred arrangement, it will invoke size limitations due to the cumulative effect of shear drag resulting from friction between the seal and the rotating disc surface. When this cumulative effect causes build-up of a compressive stress which is in excess of the elastic compression strength of the seal material, this would result in plastic flow which could cause unacceptable deformation of the seal section. This phenomenon is dependent upon the actual hoop length of individual seal sections and the compression strength of the seal material. There is therefore likely to be a fairly consistent limiting hoop length for a given seal material. For very large diameter seals, it is therefore important to establish the limiting length of the seal and to restrict actual lengths within this limit by a reasonable margin.

It is preferred that for very large diameter seals (such as tunnelling machine cutterhead seals) each complete sealing ring will consist of a plurality of independent sealing ring sections. Each of these independent sections is independently axially supported to maintain consistent gaps between the ends of adjacent sections.

It is of importance to provide a lubricant for the assembly and means are therefore provided to feed grease to a location radially outwardly of the outer sealing ring. These may include a plurality of circumferentially spaced passages in the second body portion.

In order that the present invention may more readily be understood, the following description is given, merely by way of example, reference being made to the accompanying drawings in which.

Figure 1:
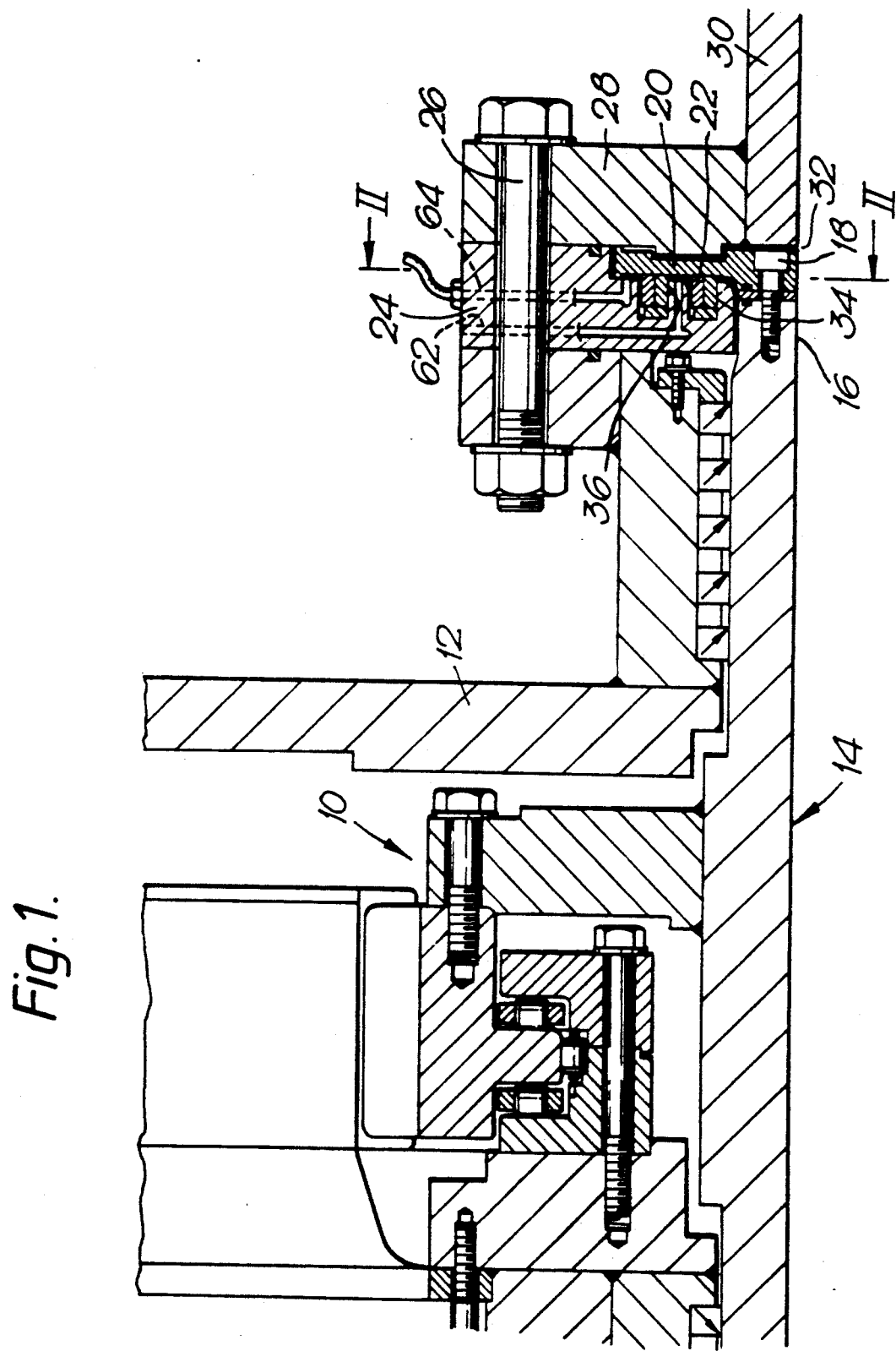
FIG. 1 is a schematic section through a portion of one embodiment of seal assembly applied to a tunnel boring machine screw conveyor.

Referring first to FIG. 1, there is illustrated a small portion 10 of the drive mechanism of a spoil conveyor system for a tunnel boring machine. This includes a portion of main housing 12 in which is rotatably mounted, by bearings (not shown), a shaft 14 constituting a first part of the assembly of the invention. A body portion 16 associated with this first part 14 is in the form of an annulus bolted on by a series of circumferentially spaced bolts 18, the body portion 16 having a flange 20, the left face 22 of which forms a seal face.

Associated with the housing 12 is a second body portion 24 which is formed as a separate part from the housing, the latter forming a second part of the assembly with which the shaft 14 is relatively rotatable.

The second body portion 24 is mounted by a series of circumferentially spaced bolts 26, which also hold on other components 28,30 with which the present invention is not concerned. It will be seen that an annular space 32 is formed between the parts 28,30 and the right-hand face of the flange 20.

The protection of the sealing units can be maximized while minimizing grease consumption by providing a labyrinth in the space 32 between the parts 28,30 and the two axial faces and the peripheral face of the flange 20. This labyrinth may include a narrow gap (A) by increasing the axial thickness 70 on the periphery of the flange. This band minimises the axial clearance (B) such that the purging grease velocity is maximised for a given volumetric grease flow. This improves purging efficiency and provides better protection for the seals. A further effect of the labyrinth provided by the narrow gap (A) is that it will also restrict access of contaminant which will itself give a degree of protection to the seals in the event of grease failure.

The narrow gap is deliberately located at or near the periphery of flange 20 so that in the event of mechanical contact resulting in service (e.g. due to the excessive wear or damage to the main bearing) this contact will be relatively soft (i.e. contact would only be made in area of minimum stiffness).

According to the invention, formed in the body portion 24 are radially spaced inner and outer annular grooves 34,36.

Figure 2:
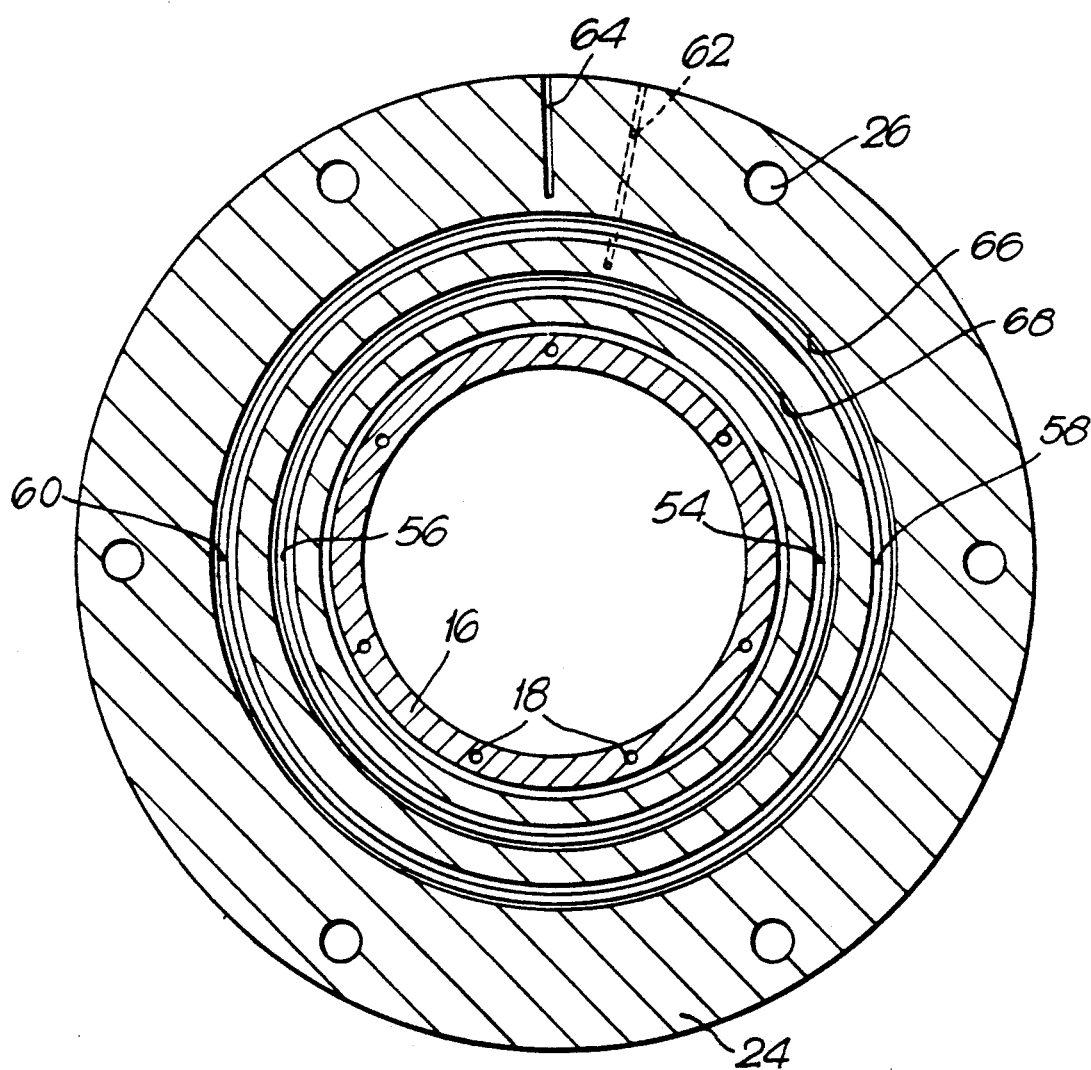
FIG. 2 is a section taken along the line II—II of FIG. 1.
Figure 3:
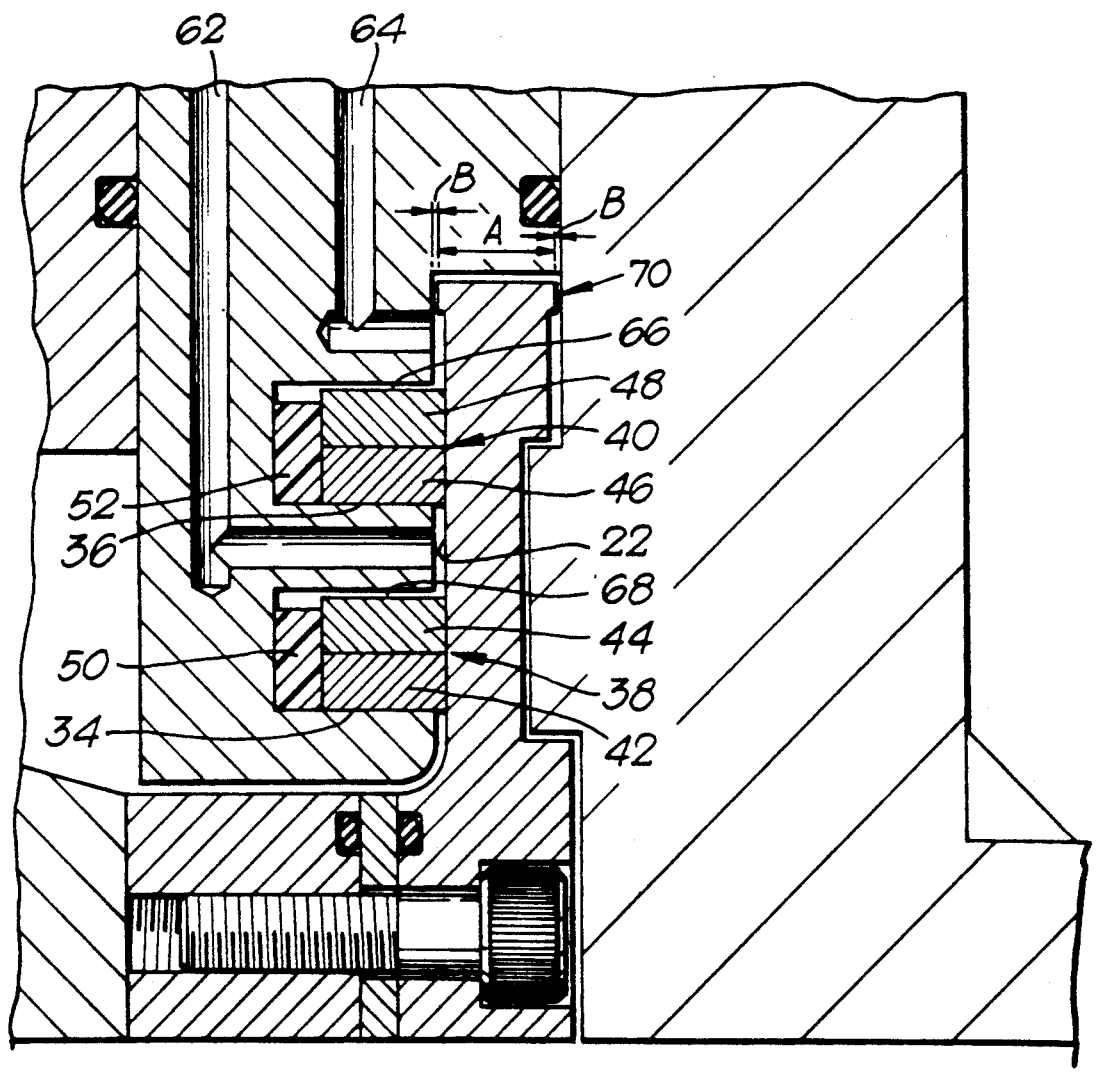
FIG. 3 is an enlarged fragmentary view of a portion of FIG. 1 illustrating the seal assembly.

As can be seen more readily in FIG. 3, the annular grooves 34,36 have, associated therewith, sealing rings indicated generally by the reference numerals 38,40. The gaps 66,68 radially outward of the sealing rings 48,44 provide the means for ensuring free access of grease behind the sealing rings so that contact pressure which varies with grease pressure is at all times only slightly above that required to provide an adequate seal. Each of these sealing rings comprises two concentric split sealing rings 42,44 and 46,48 which are urged against the face 22 by elastomeric energizers 50,52. As can be seen from FIG. 2, the rings 42-48 are each split rings, preferably formed of filled PTFE, the splits being indicated respectively at 54,56,58,60.

It will be noted that the splits of associated rings 42,44, and those of 46,48 are circumferentially off-set, as illustrated by 180°. This off-set provides adequate sealing effect.

In FIGS. 1 and 3 it will be seen that there is at least one bleed channel 62, the inner end of which opens in the face of the body member 24 between the seal assemblies 38,40 and the outer end of which opens on the exterior of the member 24. There are preferably several bleed channels, e.g. eight, only one of which has been indicated.

There is a further series of passages, preferably eight circumferentially spaced passages 64 (only one of which has been indicated), the latter being for the introduction of grease under very high pressure.

In operation, the construction is such that rather liquid spoil is present within the shaft 14 and is under very considerable pressure. This abrasive material therefore tends to become extruded outwardly into the annular slot 32 and passes around the outside of the flange 20. In normal operation, the seal 40, with its two radially abutting sealing rings 46,48 urged by the elastomeric energizer 52 against the face 22 of the flange 20 will act perfectly adequately as a seal. During operation, grease is forced under very high pressure down the passage 64.

After some considerable usage after initial installation, there will be some deterioration of the seal 40 and the spoil material (and some grease) may leak radially inwardly of the seal 40 and will be prevented from going any further by the seal 38.

As soon as this happens, some of the leaking material will pass up through the bleed passage 62 and will give a tale-tell indication that the outer seal has become inadequate and requires replacement. The operator will then stop off the passage(s) 62 and will note the date and time at which this occurred. The equipment can continuously operate perfectly satisfactorily because the seal 38 will continue to act to prevent the ingress of the spoil into the bearings of the machine. However, at a suitable time, which will normally be significantly shorter than the time that it took the seal 40 to deteriorate, the machine will be stopped and the whole seal assembly, including both the outer and inner seals 38,40, will be replaced.

Thus, at no time will it be necessary for the machine to be stopped other than when other servicing operations are being carried out upon the machine. By the provision of the tale-tell provided by the passage 62, it becomes readily apparent that a problem will occur at a predictable time thereafter.

It has been found that the particular types of seals described herein are relatively inexpensive and yet provide a perfectly adequate sealing facility.

We claim:

1. A seal assembly for sealing between a first part and a second part, the first and second parts being relatively rotatable about an axis, said assembly comprising a first body portion on the first part defining a sealing face in a plane perpendicular to the axis of rotation; a second body portion on the second part; an axial face of said second body portion extending perpendicular to the axis of rotation; two concentric, radially spaced, annular grooves opening into said axial face of said second body portion; inner and outer sealing rings accommodated by said annular grooves at radially spaced locations; axial faces perpendicular to the axis of rotation on said sealing rings in sealing engagement with said radial sealing face of the first part; means to feed grease to a region defined between said sealing face of the first part and the second body portion, radially outward of the outer sealing ring; a bleed passage in said second body portion and first and second ends of said bleed passage, said first end opening directly onto said axial face of said second body portion between said inner and outer sealing rings, and said second end opening on the exterior of said second body portion.

2. An assembly as claimed in claim 1, wherein said first part has a peripheral flange, extending axially in each direction, said flange being closely adjacent said second part effective to provide a labyrinth seal.

3. An assembly as claimed in claim 1, wherein said grooves and said sealing rings are dimensioned to provide an annular gap around each of said sealing rings.

4. An assembly as claimed in claim 2, wherein said grooves each include resilient means urging said sealing rings axially towards the sealing face of said first part.

5. An assembly as claimed in claim 4, wherein said resilient means each comprise a resilient elastomeric ring, engaged in said annular groove behind the associated sealing ring.

6. An assembly as claimed in claim 4, wherein said grooves and said sealing rings are dimensioned to provide an annular gap around each of said sealing rings, whereby pressurized grease fed via said gap behind said elastomeric ring is effective to further urge said sealing ring axially towards said sealing face of said first part.

7. An assembly as claimed in claim 1, wherein each sealing ring comprises two concentric split sealing rings mounted in nested, radially abutting relation.

8. An assembly as claimed in claim 7, wherein said split sealing rings are each formed of filled PTFE.

9. An assembly as claimed in claim 7, wherein the splits in said sealing rings of a pair are circumferentially off-set.

10. An assembly as claimed in claim 9, wherein said splits are circumferentially off-set by 180°.

11. An assembly as claimed in claim 1, wherein said means include a plurality of circumferentially spaced passages in said second body portion.

12. A seal assembly for sealing between a first part and a second part, the first and second parts being relatively rotatable about an axis, said assembly comprising a first body portion on the first part defining a sealing face in a plane perpendicular to the axis of rotation; a second body portion on the second part; an axial face of said second body portion extending perpendicular to the axis of rotation; two concentric, radially spaced, annular grooves opening into said axial face of said second body portion; inner and outer sealing rings accommodated by said annular grooves at radially spaced locations; axial faces perpendicular to the axis of rotation on said sealing rings in sealing engagement with said radial sealing face of the first part; means to feed grease to a region defined between said sealing face of the first part and the second body portion, radially outward of the outer sealing ring; said inner and outer sealing rings both comprising two concentric split sealing rings mounted in nested, radially abutting relation, said splits being circumferentially offset; a bleed passage in said second body portion and first and second ends of said bleed passage, said first end opening between said inner and outer sealing rings, and said second end opening on the exterior of said second body portion.

13. A seal assembly for sealing between a first part and a second part, the first and second parts being relatively rotatable about an axis, said assembly comprising a first body portion on the first part defining a sealing face in a plane perpendicular to the axis of rotation; a second body portion on the second part; an axial face of said second body portion extending perpendicular to the axis of rotation; two concentric, radially spaced, annular grooves opening into said axial face of said second body portion; inner and outer sealing rings accommodated by said annular grooves at radially spaced locations; axial faces perpendicular to the axis of rotation on said sealing rings in sealing engagement with said radial sealing face of the first part; said inner and outer sealing rings both comprising two concentric split sealing rings mounted in nested, radially abutting relation, said splits being circumferentially offset, a bleed passage in said second body portion and first and second ends of said bleed passage, said first end opening directly onto said axial face of said second body portion between said inner and outer sealing rings, and said second end opening on the exterior of said second body portion.

14. An assembly as claimed in claim 13, wherein said first part further comprises a peripheral flange, extending axially in each direction, said flange being closely adjacent said second part effective to provide a labyrinth seal.

15. An assembly as claimed in claim 13, wherein said grooves and said sealing rings are dimensioned to provide an annular gap around each of said sealing rings.

16. An assembly as claimed in claim 14, wherein said grooves each include resilient means urging said sealing rings axially towards the sealing face of said first part.

17. An assembly as claimed in claim 16, wherein said resilient means each comprise a resilient elastomeric ring, engaged in said annular groove behind the associated sealing ring.

18. An assembly as claimed in claim 17, wherein said grooves and said sealing rings are dimensioned to provide an annular gap around each of said sealing rings, whereby pressurized grease fed via said gap behind said elastomeric ring is effective to urge said sealing ring axially further towards said sealing face of said first part.

19. An assembly as claimed in claim 13, wherein said split sealing rings are each formed of filled PTFE.

20. An assembly as claimed in claim 13, wherein said means include a plurality of circumferentially spaced passages in said second body portion.

21. An assembly as claimed in claim 13, wherein said circumferential offset is 180°.

* * * * *